(12) United States Patent
Andreev et al.

(10) Patent No.: US 7,958,547 B2
(45) Date of Patent: Jun. 7, 2011

(54) SINGLE SIGN-ON METHOD FOR WEB-BASED APPLICATIONS

(75) Inventors: Dmitry Andreev, Larchmont, NY (US);
Gregory Vilshansky, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/348,970

(22) Filed: Jan. 6, 2009

(65) Prior Publication Data
US 2009/0126000 A1    May 14, 2009

Related U.S. Application Data

(63) Continuation of application No. 10/426,435, filed on Apr. 29, 2003, now Pat. No. 7,496,953.

(51) Int. Cl.
*H04L 29/06* (2006.01)
*G06F 21/22* (2006.01)

(52) U.S. Cl. ............. 726/8; 726/5; 726/18; 726/29

(58) Field of Classification Search .......... 726/11–14, 726/27–30, 16–19, 2–6, 8; 713/161, 182, 713/151–152
See application file for complete search history.

(56) References Cited

U.S. PATENT DOCUMENTS

| | | | |
|---|---|---|---|
| 5,241,594 A | 8/1993 | Kung | |
| 5,684,950 A | 11/1997 | Dare et al. | |
| 5,892,828 A | 4/1999 | Perlman | |
| 5,925,126 A | 7/1999 | Hsieh | |
| 5,928,363 A | 7/1999 | Ruvolo | |
| 5,933,503 A | 8/1999 | Schell et al. | |
| 5,944,824 A | 8/1999 | He | |
| 5,995,624 A | 11/1999 | Fielder et al. | |
| 6,049,877 A | 4/2000 | White | |
| 6,085,030 A | 7/2000 | Whitehead et al. | |
| 6,125,457 A | 9/2000 | Crisan et al. | |
| 6,157,953 A | 12/2000 | Chang et al. | |
| 6,158,010 A | 12/2000 | Moriconi et al. | |
| 6,178,511 B1 | 1/2001 | Cohen et al. | |
| 6,212,640 B1 * | 4/2001 | Abdelnur et al. ............ | 726/2 |

(Continued)

OTHER PUBLICATIONS

Notice of Allowance (Mail Date Oct. 20, 2008) for U.S. Appl. No. 10/426,435, filed Apr. 29, 2003; Confirmation No. 5108.

(Continued)

*Primary Examiner* — Minh Dinh
*Assistant Examiner* — Venkat Perungavoor
(74) *Attorney, Agent, or Firm* — Schmeiser, Olsen & Watts; Anna L. Linne (57) ABSTRACT

A method for single-sign on of a user on a client machine to one or more target applications on target application servers in a computer information-processing network, including: accessing an access server from the client machine; entering user-specific access server logon credentials for logon and access to the access server; selecting a target application; presenting to the target application by the access server, previously stored user-specific target application logon credentials for logon and access to the target application in a form and according to a protocol recognizable by the target application thereby logging into the target application on behalf of the user and establishing a target application session; sending from the access server to the client machine, information for establishing a connection from the client machine to the target application; and establishing a target application session, bypassing the access server, between the client machine and the target application.

23 Claims, 7 Drawing Sheets

U.S. PATENT DOCUMENTS

| | | | |
|---|---|---|---|
| 6,219,700 B1 | 4/2001 | Chang et al. | |
| 6,240,512 B1 | 5/2001 | Fang et al. | |
| 6,243,816 B1 | 6/2001 | Fang et al. | |
| 6,256,737 B1 | 7/2001 | Bianco et al. | |
| 6,275,944 B1 | 8/2001 | Kao et al. | |
| 6,327,659 B2 | 12/2001 | Boroditsky et al. | |
| 6,453,353 B1 * | 9/2002 | Win et al. | 709/229 |
| 6,463,455 B1 | 10/2002 | Turner et al. | |
| 6,496,855 B1 * | 12/2002 | Hunt et al. | 709/217 |
| 2001/0028364 A1 | 10/2001 | Fredell et al. | |
| 2001/0054035 A1 | 12/2001 | Lee | |
| 2001/0054155 A1 | 12/2001 | Hagan et al. | |
| 2002/0007460 A1 | 1/2002 | Azuma | |
| 2002/0010776 A1 | 1/2002 | Lerner | |
| 2002/0019837 A1 | 2/2002 | Balnaves | |
| 2002/0029269 A1 | 3/2002 | McCarty et al. | |
| 2002/0120866 A1 | 8/2002 | Mitchell et al. | |
| 2002/0138763 A1 * | 9/2002 | Delany et al. | 713/201 |
| 2002/0156905 A1 | 10/2002 | Weissman | |
| 2002/0194508 A1 * | 12/2002 | Sanchez et al. | 713/202 |
| 2003/0158945 A1 | 8/2003 | Liu | |
| 2003/0158949 A1 | 8/2003 | Miller et al. | |
| 2003/0200442 A1 * | 10/2003 | Bhat et al. | 713/182 |
| 2003/0212806 A1 * | 11/2003 | Mowers et al. | 709/229 |
| 2004/0260807 A1 | 12/2004 | Glommen et al. | |
| 2005/0021731 A1 | 1/2005 | Sehm et al. | |
| 2006/0007858 A1 | 1/2006 | Fingerhut et al. | |
| 2006/0085734 A1 | 4/2006 | Balnaves | |
| 2006/0143267 A1 | 6/2006 | Smithline et al. | |
| 2006/0248452 A1 | 11/2006 | Lambert et al. | |
| 2007/0118769 A1 | 5/2007 | England et al. | |

OTHER PUBLICATIONS

Servlet/Applet/HTML Authentication Process With Single Sign-On, 429128, Research Disclosure, Jan. 2000; pp. 163-164.

* cited by examiner

SINGLE SIGN-ON METHOD FOR WEB-BASED APPLICATIONS

This application is a continuation of U.S. patent application Ser. No. 10/426,435 filed on Apr. 29, 2003, now U.S. Pat. No. 7,496,953, Issued Feb. 24, 2009.

FIELD OF THE INVENTION

The present invention relates generally to accessing heterogeneous applications in an Internet protocol-based (IP) network; more specifically, it relates to method of single sign-on to heterogeneous target applications on an IP network.

BACKGROUND OF THE INVENTION

In today's web-based application hosting environment, a single portal may allow connection to many externally hosted and independently operated web-based heterogeneous applications that require user authentication. It would be most useful to provide single sign-on (SSO) to these applications. However, there are a number of challenges to overcome in providing SSO functionality. These challenges include, providing SSO transparency to the end user and providing portal and application security while limiting the need to modify client software and conserve portal bandwidth usage.

SUMMARY OF THE INVENTION

A first aspect of the present invention is a method for single-sign on of a user on a client machine to one or more target applications on target application servers in a computer information-processing network, comprising: accessing an access server from the client machine; entering user-specific access server logon credentials for logon and access to the access server; selecting a target application; presenting to the target application by the access server, previously stored user-specific target application logon credentials for logon and access to the target application in a form and according to a protocol recognizable by the target application and thereby logging into the target application on behalf of the user and establishing a target application session; sending from the access server to the client machine, information for establishing a connection from the client machine to the target application; and establishing a target application session, bypassing the access server, between the client machine and the target application.

A second aspect of the present invention is a system architecture for single-sign on of a user on a client machine to one or more target applications on target application servers in a computer information-processing network, comprising: means for accessing an access server from the client machine; means for entering user-specific access server logon credentials for logon and access to the access server; means for selecting a target application; means for presenting to the target application by the access server, previously stored user-specific target application logon credentials for logon and access to the target application in a format and according to a protocol recognizable by the target application and thereby logging into the target application on behalf of the user and establishing a target application session; means for sending from the access server to the client machine, information for establishing a link from the client machine to the target application; and means for establishing a target application session, bypassing the access server, between the client machine and the target application.

A third aspect of the present invention is a program storage device readable by machine, tangibly embodying a program of instructions executable by the machine to perform method steps for single-sign on of a user on a client machine to one or more target applications on target application servers in a computer information-processing network the method steps comprising: facilitating access to an access server from the client machine; facilitating entering of user-specific access server logon credentials for logon and access to the access server; selecting a target application; presenting to the target application by the access server, previously stored user-specific target application logon credentials for logon and access to the target application in form and according to a protocol recognizable by the target application and thereby logging into the target application on behalf of the user and establishing a target application session; and establishing target application session, bypassing the access server, between the client machine and the target application.

A fourth aspect of the present invention is an access server connectable in an information process network, comprising: at least one processor; a memory; a computer program supported in the memory for enabling access to access to a target application on a target application server linked to the information-processing network, the computer program comprising: means for accessing the access server from the client machine; means for entering user-specific access server logon credentials for logon and access to the access server; means for selecting the target application; means for presenting to the target application by the access server, previously stored user-specific target application logon credentials for logon and access to the target application in a form and according to a protocol recognizable by the target application and thereby logging into the target application on behalf of the user and establishing a target application session; and means for establishing a target application session, bypassing the access server, between the client machine and the target application.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

For the purposes of describing the present invention the following terms are defined:

A target application is an IP network product requiring user authentication and session tracking.

A portal is defined as an application containing at least a personalized page of links to target applications. Portals may include pages containing data dynamically collected from target applications. Portals may include portlets. A portal is an example of an access server.

A portlet is defined as a server-side software module that renders as an element of a client browser document screen and provides a user interface for an application.

A user is defined as a person running a client browser. A client browser runs on a client machine.

A session is defined as a sequence of HTTP requests and responses traversing between a client browser and the target application or an access server, beginning with sign-on and ending with either closing of the browser window or an explicit logoff operation.

A proxy server is defined as software running on a machine that intercepts session communications between a client machine and a target application server. A proxy server is an example of an access server.

A servlet is defined as a module of Java code that runs in a server application in order to respond to client requests.

Logon is defined as a process of client authentication, which is limited to entering a user-specific credentials, examples of which are a user ID and a password, for the purpose of gaining access to a target application. Note, a password, though usually required by many target applications is not a requirement of the present invention and whenever a password is mentioned, its use should be understood to be optional. The term sign-on and logon are synonymous terms.

A user ID is defined as a target application-specific identifier of a user.

A Portal User ID (PUID) is defined as a portal-specific identifier of a user.

A single sign-on (SSO) is defined as a functionality, which is often provided by an access server which allows a user to access target applications linked to the access server without re-entering target application specific information such as user ID and password during a session initiated by successful authentication of the user with the access server.

An SSO engine is defined as a software product implementing SSO functionality. An SSO engine runs on an access server, examples of which include a portal or a proxy server.

Figure 1:
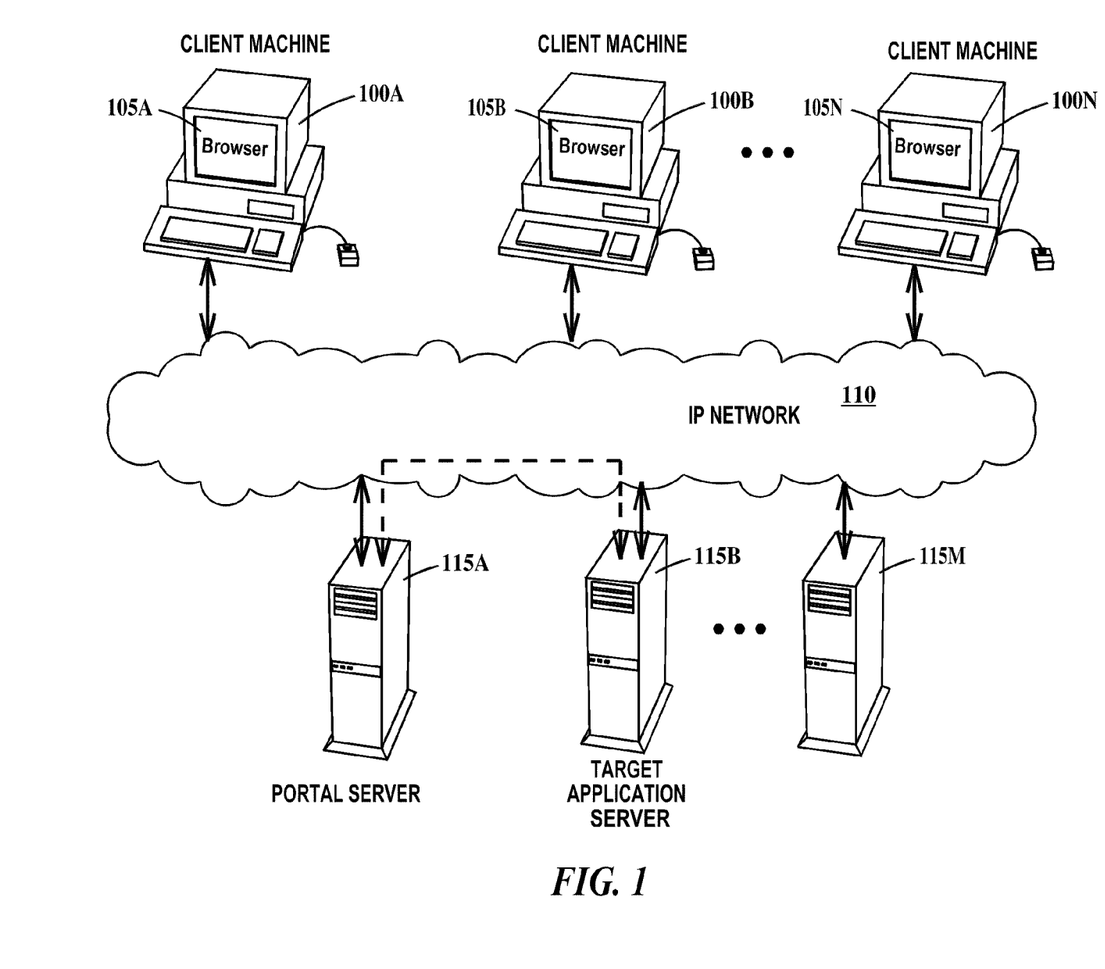
FIG. 1 is a computer network environment in which the present invention may be implemented.

FIG. 1 is a computer network environment in which the present invention may be implemented. In FIG. 1, a multiplicity of client machines (computers) 100A, 100B through 100N, each running a client browser 105A, 105B through 105N, are linked to an IP network 110. In one example, IP Network 110 is The Internet. In a second example, IP Network 110 is an intranet. In a third example, IP Network 110 is a combination of The Internet and an intranet. Also linked to IP Network 110 is a multiplicity of servers (computers) 115A, 115B through 115M.

For descriptive purposes, server 115A is type of access server called a portal server and server 115B is a target application server. Access servers are computers that include at least one central processing unit (CPU), memory and means to load programs into memory and means to execute program instructions stored in memory. In a SSO environment, a user of, for example, client machine 100A logs onto portal server 115A using a PUID. An SSO engine residing on portal server 115A automatically logs the user onto target application server 115B as indicated by the dashed lines. Thereafter, client machine 110A connects directly to target application server 115B and the session on the target application server is taken over by the client machine.

Figure 2:
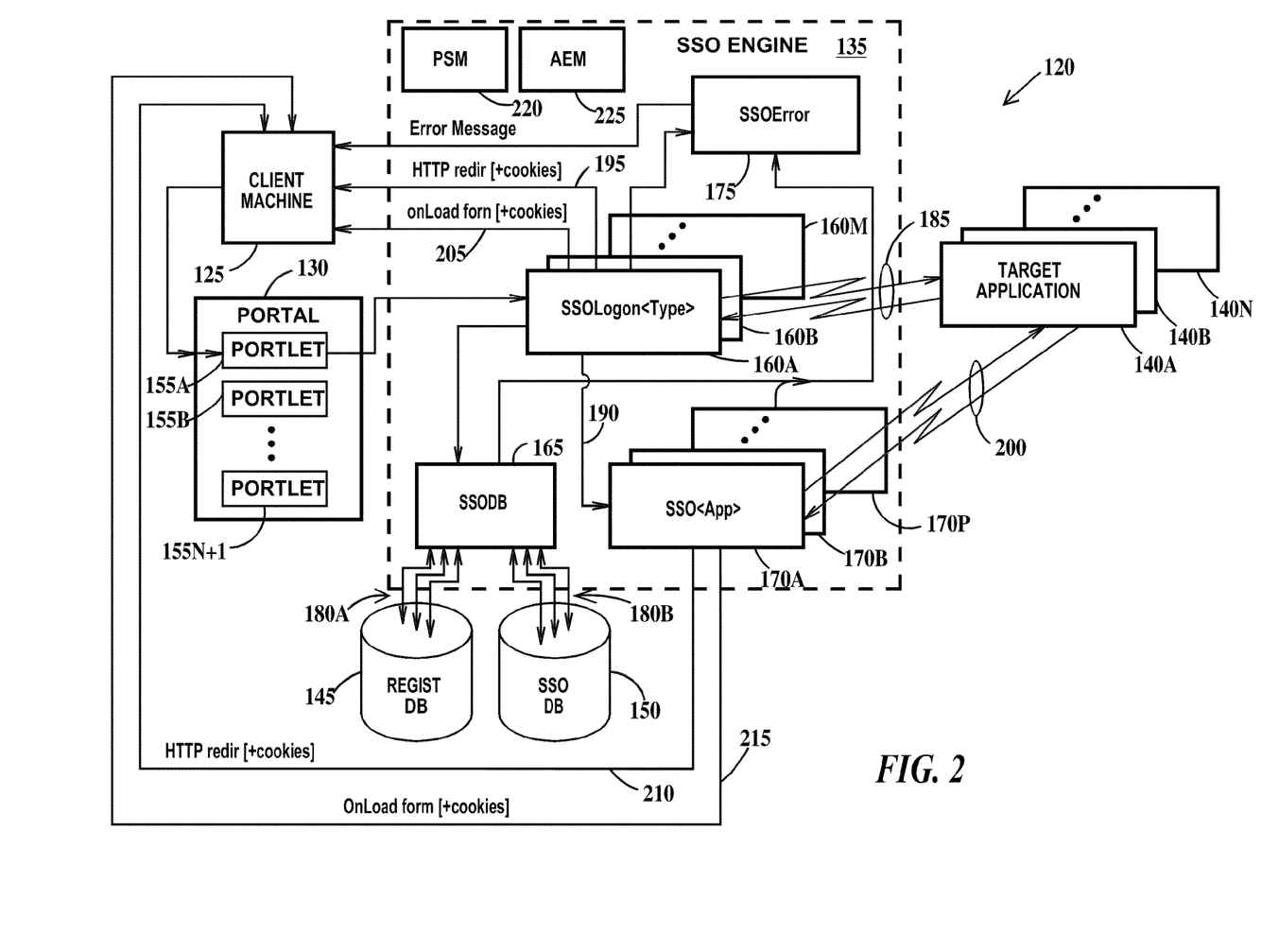
FIG. 2 is a block diagram of a system architecture for performing SSO according to the present invention.

FIG. 2 is a block diagram of a system architecture for performing SSO according to the present invention. In FIG. 2, system architecture 120 includes a client machine 125 (running a browser), a portal (running on a server) 130, an SSO engine 135 (which may reside on portal 130, or another server accessible from the portal), a multiplicity of target applications 140A, 140B through 140N, a registration database 145 and a SSO database 150. Registration database 145 and SSO database 150 may reside on portal 130, a proxy server, or another server. Client machine 125, portal 130, SSO engine 135, target applications 140A, 140B through 140N, registration database 145 and SSO database 150 are linked, as appropriate, directly or through an IP Network as described supra in reference to FIG. 1.

Registration database 145 contains target application user IDs and credentials, such as passwords specific to each user. SSO database 150 contains information specific to each target application such as how target applications handle logons. Examples of how target applications handle logons include but are not limited to: cookies, universal resource locator (URL) rewrites and hidden form fields or any combination thereof, as well as the sequence of their sending/receiving by the target application, together with any relevant numerical and non-numerical parameters. Portal 130 includes a multiplicity of portlets 155A, 155B through 155N+1. There is one portlet 155A, 155B through 155N for each corresponding target application 140A, 140B through 140N. Portlet 155N+1 is an initial setup portlet, the operation which is described infra with respect to FIG. 4. Portlets 155A, 155B through 155N are displayed by the browser on client machine 125.

SSO engine 135 includes a multiplicity of SSOLogon<Type> program modules, which are servlets in the exemplary embodiment, (hereafter SSOLogon servlets) 160A, 160B through 160M, an SSODB program module, which is a servlet in the exemplary embodiment, (hereafter SSODB servlet) 165, a multiplicity of SSO<App> program modules, which are servlets in the exemplary embodiment, (hereafter SSOApp servlets) 170A, 170B through 170P and an SSOError program module, which is a JSP in the exemplary embodiment, (hereafter SSOError page) 175.

Each SSOLogon servlet 160A, 160B through 160M is used to implement logon behavior that is common for sub-sets of target applications 140A, 140B through 140N that share common logon requirements procedures. There may be a one-to-one or one-to-many correspondence between the each SSO-Logon servlets 160A, 160B through 160M and each target applications 140A, 140B through 140N. SSLogon servlets 160A, 160B through 160M retrieve user-specific and target application-specific information from registration database 145 and SSO database 150 through SSODB servlet 165. Depending upon the target-specific logon rules, SSLogon servlets 160A, 160B through 160M performs either: (a) send an onload form (a form which does not require user response and initiates an HTTP request as specified in the form immediately after it is loaded by the browser) with hidden fields (fields that are not displayed to the user on the users browser, that cannot be updated and from which the default value is always returned to the server) containing the user credentials for the target application, to the client; (b) communicates with a target application to obtain a target URL for the logon form and/or cookies, and then performs (a); (c) communicates with the target application using a user ID and password from registration database 145, and sends HTTP redirect to the resulting URL to the client; or (d) writes the user-specific and target application specific data to a session object and then calls a corresponding SSOApp servlet 170A, 170B through 170P.

SSOApp servlets 170A, 170B through 170P implement target application-specific logon procedures, an example of such procedures being presentation of a multi-framed logon screen to the browser on client machine 125. There is one or less SSOApp servlet 170A, 170B through 170P for each corresponding SSOLogon servlet 160A, 160B through 160M.

SSODB servlet 165 maintains a pool of connections 180A to registration database 145 and a pool of connections 180B to SSO database 150 and serves user-specific and target application-specific information to other servlets in SSO engine 135.

SSOError page 175 presents error messages to the browser on client machine 125 in the event of errors in the logon process. Examples of errors that may occur in the logon process include no connection to the target application, invalid user ID or invalid password.

In operation one portlet 155A, 155B through 155N in portal 130 invokes one SSOLogon servlet 160A, 160B through 160M that is specific for the logon type and session-tracking mechanism of the requested target application 140A, 140B through 140N. When the user activates the link (typically by clicking on it) the invoked SSOLogon servlet 160A, 160B through 160M starts with the requested target application 140A, 140B through 140N specified as a parameter. Portal user ID is passed to the invoked SSOLogon servlet 160A, 160B through 160M within a session object. The invoked SSOLogon servlet 160A, 160B through 160M retrieves from registration database 145 the user ID for the requested target application 140A, 140B through 140N and retrieves from SSO database 150 the requested target applications specific sign-on rules and parameters such as logon URL, form field names, etc. The invoked SSOLogon servlet 160A, 160B through 160M follows the specific sign-on rules, sending a series of HTTP requests to the requested target application 140A, 140B through 140N and recording cookies and/or dynamic mark-up language (DHTML) parameters that the requested target application responds with. The requested target application 140A, 140B through 140N sends the last HTML page to the browser on client machine 125 and from this point on, the client browser takes over the requested target application 140A, 140B through 140N session.

Note, in the event of the need to process target application-specific behavior such as multi-framed logon screens, the invoked SSOLogon servlet 160A, 160B through 160M passes logon control to a corresponding SSOApp servlet 170A, 170B through 170P starting with the sending of the series of HTTP requests to the requested target application 140A, 140B through 140N.

Table 1 illustrates some of the possible transitions (shown in FIG. 2) of system architecture 120.

TABLE 1

| Example | Transitions | Scenario |
| --- | --- | --- |
| 1 | 195 | The target application (TA) is using simple logon form with no cookies and no URL rewriting. |
| 2 | 185 + 205 | The logon form is obtained by SSO engine on behalf of the client after several redirects by TA using URL rewriting. SSO engine sends the user ID and password to the TA and redirects the client to the first page after the logon |

TABLE 1-continued

| Example | Transitions | Scenario |
| --- | --- | --- |
| 3 | 185 + 195 | Same as (Example 1), but the logon form is obtained after URL rewriting by TA, or cookies are sent with the logon form. |
| 4 | 190 + 200 + 210 | Same as (Example 2), but the TA exhibits some application-specific behavior (e.g., multi-framed logon screen). |
| 5 | 190 + 200 + 215 | Same as (Example 3), but the TA exhibits some application-specific behavior (e.g., multi-framed logon screen). |

Figure 4:
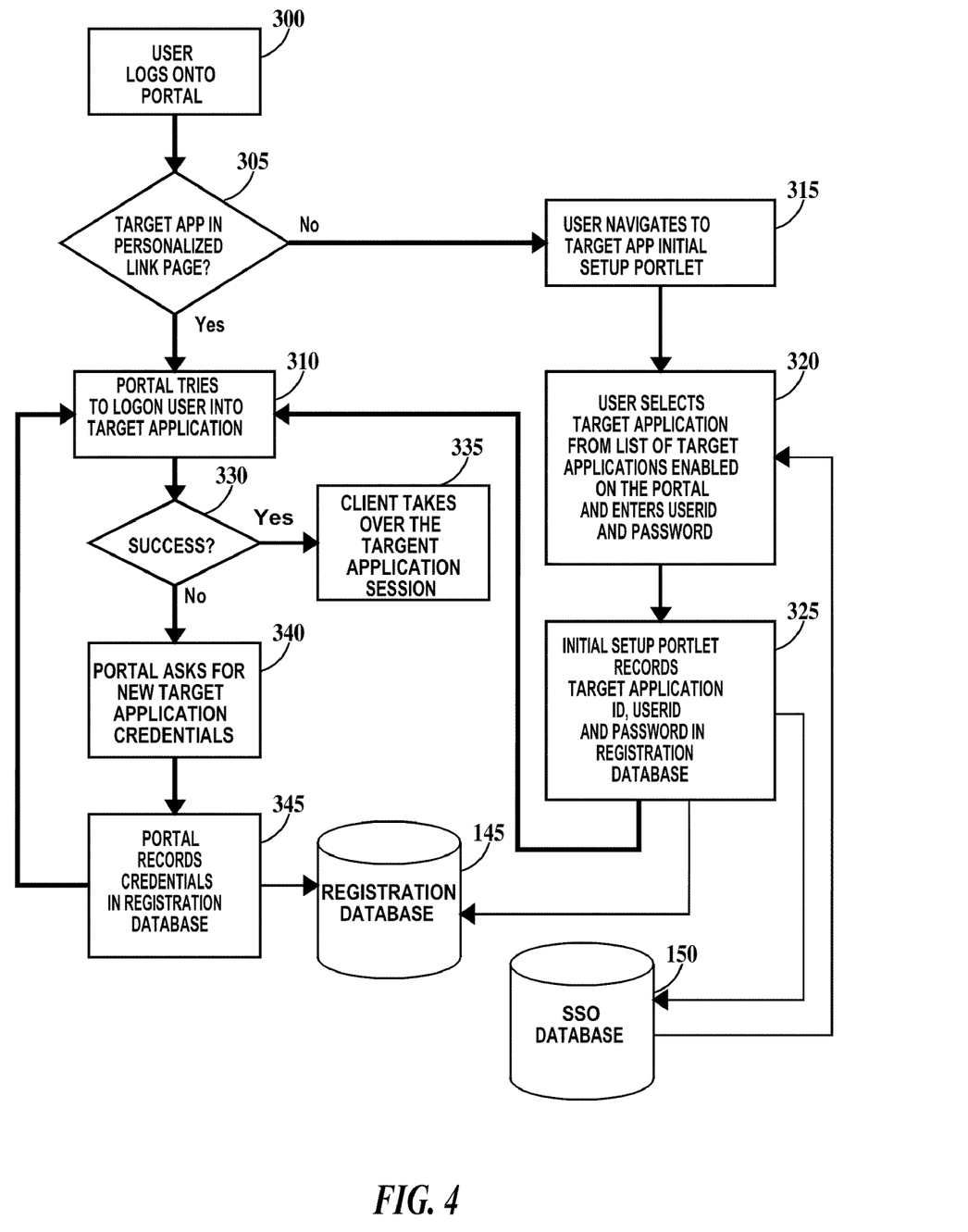
FIG. 4 is a flowchart of the operations of password initialization and synchronization and update according to the present invention
Figure 5:
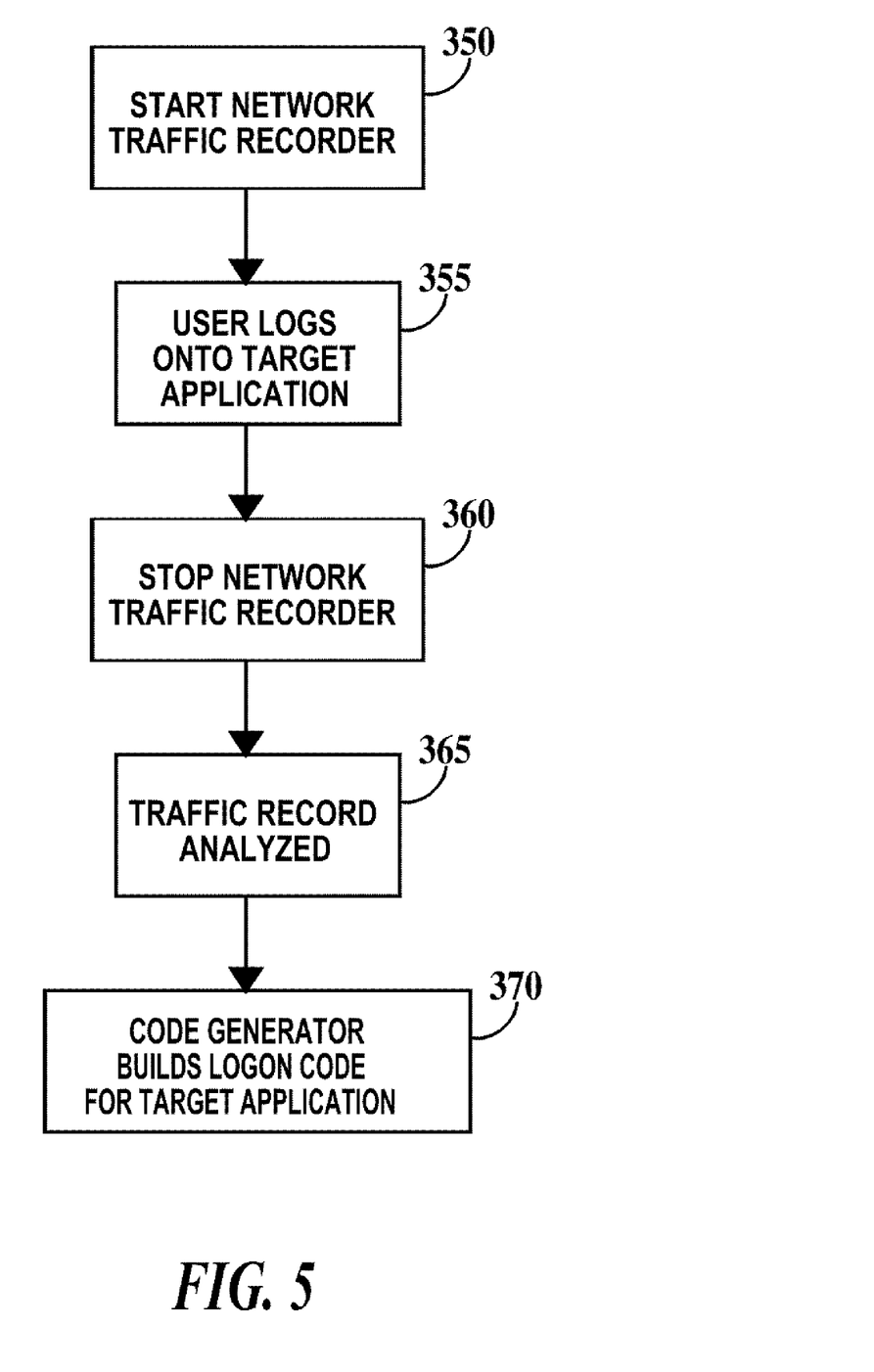
FIG. 5 is a flowchart of the operation a network traffic recorder for automatically generating logon code for a target application according to the present invention.

SSO engine 135 further includes a password synchronization module (PSM) 220 and an optional automated enablement module (AEM) 225. The operation of password synchronization module 220 is illustrated in FIG. 4 and described infra. The operation of automated enablement module 225 is illustrated in FIG. 5 and described infra.

Figure 3:
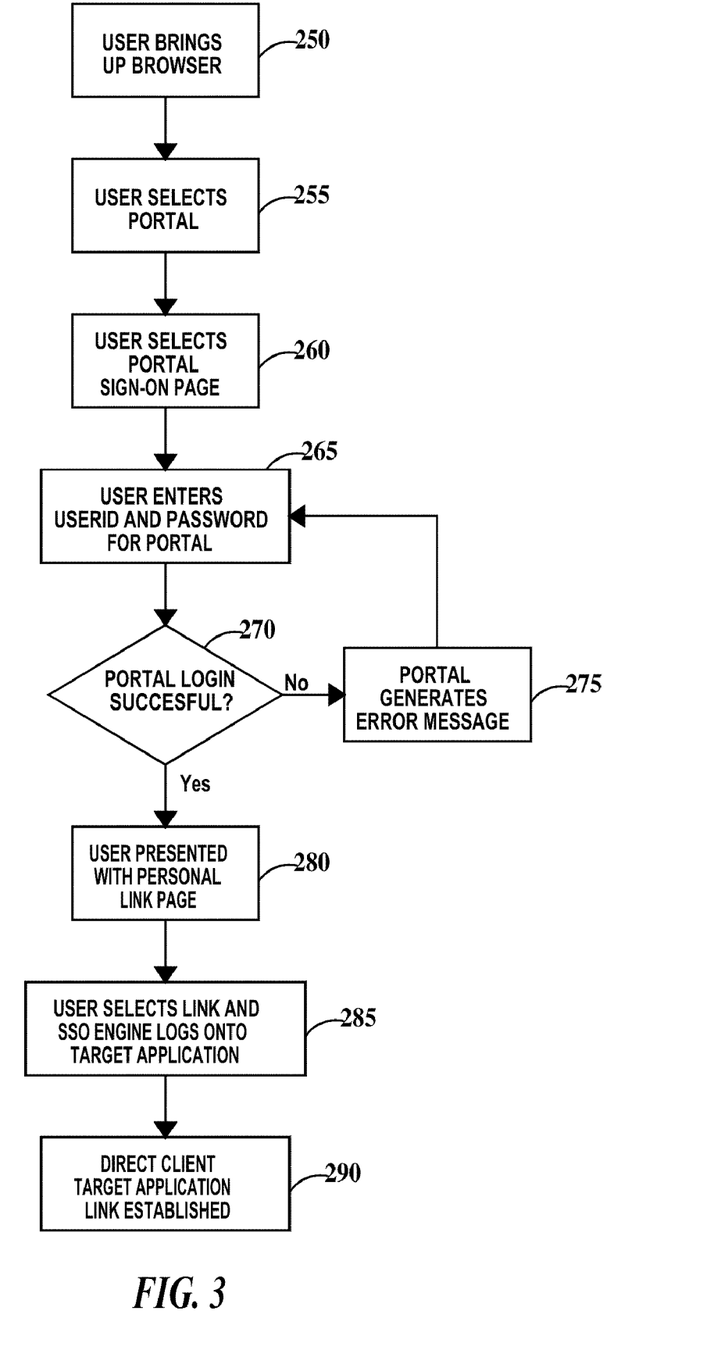
FIG. 3 is a flowchart of the method of performing SSO according to the present invention.
Figure 6:
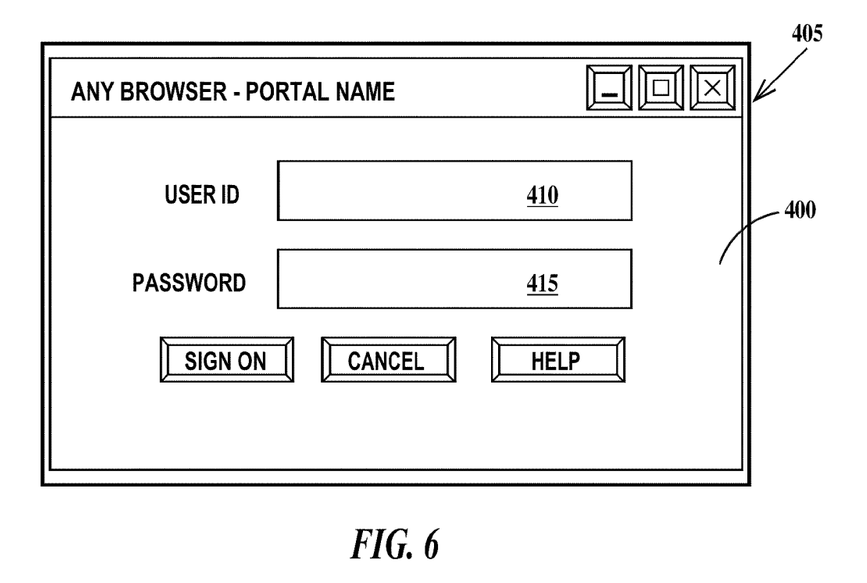
FIG. 6 is an exemplary graphical user interface (GUI) screen for an SSO transaction according to the present invention.

FIG. 3 is a flowchart of the method of performing SSO according to the present invention. In step 250, the user brings up a browser on a client machine. In step 255, the user selects a portal (example: ANYBANK.COM). In step 260, the user navigates to the portal logon page. An example of a portal logon page is illustrated in FIG. 6 and described infra. In step 265, the user logs into the selected portal using the user=s PUID and a password. In step 270, it is determined if the logon to the portal was successful. If the logon was successful, the method proceeds to step 280, otherwise the method proceeds to step 275 where the portal generates an error message and then the method loops back to step 265. In step 280, the user is presented with a personal link page on the users browser. The personal link page contains links to other pages in the portal, for example, ANYBANK.COM\SAVINGS and ANYBANK.COM\CHECKING as well as links to previously registered external (to ANYBANK.COM) target applications, for example, ANYBROKERAGEHOUSE.COM. A previously registered target application is one in which logon and access credentials, generally a user ID and password) have been stored in registration database 145 (see FIG. 2).

In step 285, the user selects a link to an external target application, starting the SSO engine. As described supra in reference to FIG. 2, when starting the SSO engine invokes a servlet that is specific for the logon type and session-tracking mechanism of the selected target application is invoked which starts with the target application specified as a parameter. The user=s PUID is passed to the servlet within a session object. The servlet retrieves from the database the user ID for the selected target application and selected target application=s specific sign-on rules/parameters (logon URL, form field names, etc.). Next, the servlet will follow these rules by usually sending a series of HTTP requests to the target application, and recording the cookies and/or DHTML parameters that the selected target application responds with. Then, in step 290, the last HTML page will be sent back to the client browser, possibly along with a cookie. The last page may need to have all the URL links on it changed from relative to absolute format. A direct client to target application connection is established and the client machine takes over the target application session.

FIG. 4 is a flowchart of the operations of password initialization and synchronization and update according to the present invention. The steps illustrated in FIG. 4 are performed or controlled by PSM 220 of FIG. 2 unless otherwise noted. In step 300, a user logs onto a portal, accesses their personalized link page and selects a target application from the displayed links or decides to setup a new link to a target application. If in step 305, the user selects a link then the method proceeds to step 310. If in step 305, the user decides to setup a new link to a target application, the method proceeds to step 315. In step 315, the user navigates to a target application initial setup portlet of the portal.

Next in step 320, the user selects a target application from a list of target applications enabled on the portal (those that the SSO engine can automatically configure logon and access to) and enters a user ID and password. Then in step 325, the initial setup portlet identifies the target application type (by target application ID) from SSO database 150 (see FIG. 2) with respect to sign-in procedures and records the target application ID, user ID and password in the registration database 145 (also see FIG. 2). The method then returns to step 310.

In step 310, the portal the portal attempts (via the SSO engine) to logon onto the corresponding target application as described supra. In step 315, the portal (via the SSO engine) determines if logon is successful by finding a predefined string pattern in the HTTP response from the target application such as Awrong, @Adenied@ or Aretry@ or by discovering that no cookie has been received or that the cookie or the whole HTTP response received is significantly different (in format or size) from the expected cookie or the whole HTTP response. The specific tests made on the cookie or the whole HTTP response is based on and configured by target application type. If in step 315, logon is successful then in step 335, the client machine takes over the target application session from the portal.

However, if in step 315, the logon is not successful then in step 340, the portal asks the user for new target application credentials (i.e. user ID and password). Then in step 345, the portal records the credentials in registration database 145 (see also FIG. 2) and the method loops back to step 310.

FIG. 5 is a flowchart of the operation a network traffic recorder for automatically generating logon code for a target application according to the present invention. The steps illustrated in FIG. 5 are performed or controlled by AEM 225 of FIG. 2 unless otherwise noted. In step 350, a network recorder is started on the portal (or proxy server) between the users browser on a client machine and the target application. In step 355, the user performs the logon operation against the target application. In step 360, the traffic recorder is stopped. In step 365, the traffic recorded is matched against predefined sets of known logon sequences.

In a first example, the logon sequence is (i) HTTP request for a logon page, (ii) HTTP response containing a form and a first cookie, (iii) HTTP request (POST) with form fields set and the first cookie and (iv) HTTP response with the first cookie and a second cookie. In a second example, the logon sequence is (i) HTTP request for a logon page, (ii) HTTP response containing a form and a first cookie, (iii) HTTP request (POST) with form fields set and the first cookie and (iv) HTTP response with the first cookie, a second cookie and a HTTP redirect and (v) HTTP request (POST) with form fields set and both first and second cookies. Requests are from the client browser, responses from the portlet (or proxy server).

In step 370, a code generator builds a logon code from predefined code portions based on the type of the logon sequence. Steps 350, 355, 360, 365 and 370 essentially replace (or supplement by offering an alternative parallel path) steps 315, 320 and 325 of FIG. 4.

FIG. 6 is an exemplary GUI screen for an SSO transaction according to the present invention. In FIG. 6, a portal logon page 400 is displayed in a browser window 405. Examples of browsers include Netscape 7 Communicator by Netscape Communications Corporation, Internet Explorer by Microsoft, and IBM Personal Communicator by IBM Corporation. A first input field 410 is provided in portal logon page 400 for a user to enter a PUID and a second input field 415 is provided for a user to enter a portal password.

Figure 7:
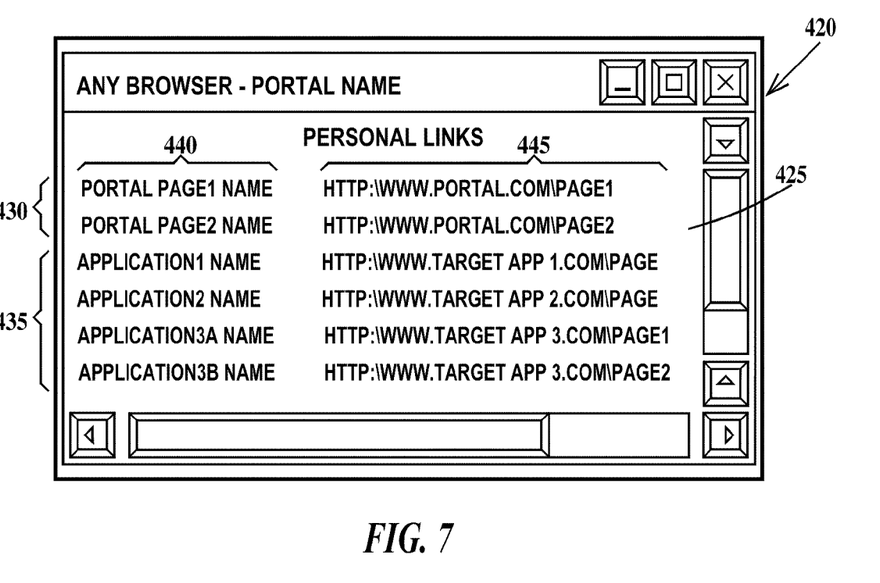
FIG. 7 is an exemplary GUI screen for displaying a personal link page for accessing target applications by an end user after an SSO logon into a portal according to the present information.

FIG. 7 is an exemplary GUI screen for displaying a personal link page for accessing target applications by an end user after an SSO logon into a portal according to the present information. In FIG. 7, a personal link page 420 is displayed in a browser window 425. Personal link page 420 may include a multiplicity of portal links 430 for accessing other pages within the portal and a multiplicity of previously registered target application links 435 for accessing one or more pages within target applications. Link names 440 may be supplied by the user or automatically during initial setup. The actual hypertext links 445 are supplied automatically during initial setup.

Figure 8:
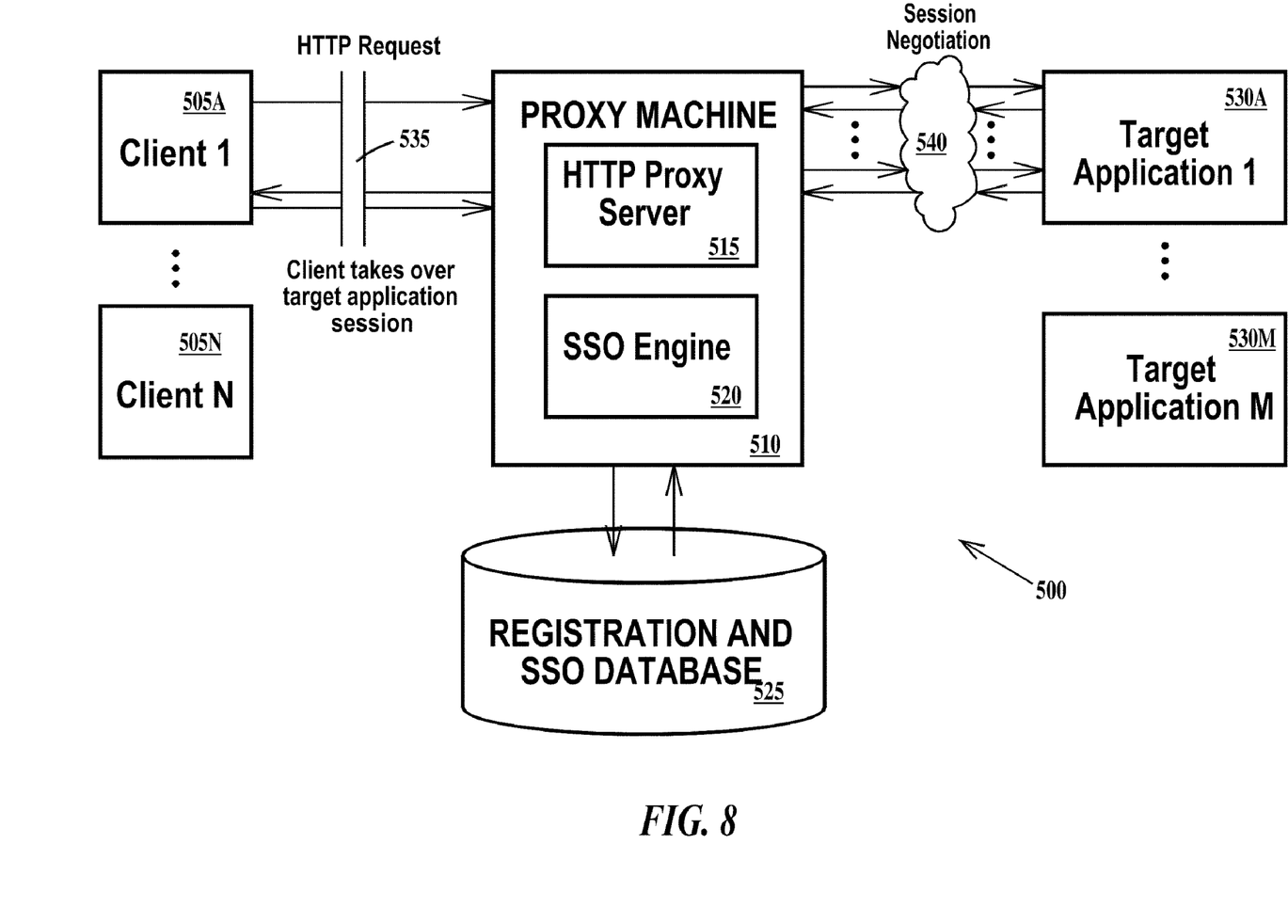
FIG. 8 is a block diagram of a hypertext transfer protocol (HTTP) proxy server implementation of the present invention.

FIG. 8 is a block diagram of a hypertext transfer protocol (HTTP) proxy server implementation of the present invention. In FIG. 8, a system 500 includes a multiplicity of client machines 505A through 505N (each running a browser), a proxy machine 510 including an HTTP proxy server 515 and an SSO engine 520. Proxy machine 510 is linked to a registration and SSO database 525. System 500 further includes a multiplicity of target applications 530A through 530M. Client machines 505A through 550N are linked to proxy machine 510 by, for example, an intranet 535. Proxy machine 510 is linked to target application 530A through 530M by any IP Network including, but not limited to, other intranets, and The Internet.

SSO engine 520 is similar to SSO engine 135 illustrated in FIG. 2 and described supra. HTTP proxy server 515 serves the same function as portal 130 also illustrated in FIG. 2 and described supra. SSO database 525 stores similar information as is stored in registration database 145 and SSO database 150 illustrated in FIG. 2 and described supra.

In operation, a user of system 500 is required to authenticate with SSO engine 520 by pointing their browser to the proxy server logon page or by automatically being redirected to the proxy logon page when the user tries to access a target application (an initial HTTP request) without having first been authenticated by the proxy server.

Subsequent HTTP requests to the target application will be intercepted by the proxy machine, which will logon to the target application and return to the users browser a page beyond the application logon page along with necessary cookies. The client machine then takes over the target application server, even though request and responses pass through proxy machine 510.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method for single sign-on of a user on a client machine to one or more target applications on target application servers in a computer information-processing network, comprising:

before accessing said target application server, accessing an access server from a browser on said client machine;

entering into said browser user-specific access server logon credentials for logon and access to said access server and logging onto said access server;

while logged onto said access server, selecting a link to a target application of said one or more target applications from a linkpage presented to said browser by said access server, user-specific target application logon credentials for said target application having been previously stored in a registration database;

after said selecting said link, said access server presenting to said target application said stored user-specific target application logon credentials for logon and access to said target application in a form and according to a protocol recognizable by said target application and thereby logging into said target application on behalf of the user and establishing a target application session between said client machine and said target application;

after logging onto said access server and after establishing said target application session, bypassing said access server; and wherein said client machine is linked to said access server by a network, both said client machine and said access server are linked to a single sign-on engine by said network and said single sign-on engine is linked to said target application servers by said network, said single sign-on engine including two or more single sign-on logon servlets, a single sign-on database module, two or more single sign-on application servlets, a single sign-on registration database, a single sign-on database and a single sign-on error program module.

2. The method of claim 1, further including, for a new target application not having links on said linkpage:

selecting a new target application;

entering a new user-specific target application logon credential for logon and access to said new target application, and recording said new user-specific application logon credential using a network traffic recorder;

generating logon code for said new target application based on network traffic recorded by said traffic recorder and a logon sequence type;

storing said logon code and said user-specific target application logon credentials for said new target application in said registration database; and adding a link on said linkpage for said new target application.

3. The method of claim 2, further including:
selecting said new target application from a list of enabled target applications.

4. The method of claim 3, further including:
determining a logon sequence type for said new user-specific target application logon credentials.

5. The method of claim 4, wherein said logon sequence type is selected from the group consisting of (i) a HTTP request for a logon page, (ii) a HTTP response containing a form and a first cookie, (iii) a HTTP request with form fields set and said first cookie and (iv) a HTTP response with said first cookie and a second cookie, (v) a HTTP response with a first cookie, a second cookie and a HTTP redirect, and (vi) a HTTP request with form fields set and both said first and second cookies.

6. The method of claim 1, wherein said information for establishing a connection from said client machine to said target application further includes cookies and rewritten universal resource locators or combinations thereof.

7. The method of claim 1, wherein said information-processing network is an intranet, The Internet or a combination thereof.

8. The method of claim 1, wherein said access server is a portal server or an HTTP proxy server.

9. The method of claim 1, wherein said user-specific access server logon credentials include a user ID, a password or both a user ID and a password.

10. The method of claim 1, wherein said user-specific target application logon credentials include a user ID, a password or both a user ID and a password.

11. A computer system comprising a processor, an address/data bus coupled to said processor, and a non-transitory computer-readable memory unit coupled to communicate with said processor, said memory unit containing instructions that when executed by the processor implement a method for single sign-on of a user on a client machine to one or more target applications on target application servers in a computer information-processing network, said method comprising the computer implemented steps of:

before accessing said target application server, accessing an access server from a browser on said client machine;

entering into said browser user-specific access server logon credentials for logon and access to said access server and logging onto said access server;

while logged onto said access server, selecting a link to a target application of said one or more target applications from a linkpage presented to said browser by said access server, user-specific target application logon credentials for said target application having been previously stored in a registration database;

after said selecting said link, to said target application by said access server said stored user-specific target application logon credentials for logon and access to said target application in a form and according to a protocol recognizable by said target application and thereby logging into said target application on behalf of the user and establishing a target application session between said client machine and said target application;

bypassing said access server after logging onto said access server and after establishing said target application session; and wherein said client machine is linked to said access server by a network, both said client machine and said access server are linked to a single sign-on engine by said network and said single sign-on engine is linked to said target application servers by said network, said single sign-on engine including two or more single sign-on logon servlets, a single sign-on database module, two or more single sign-on application servlets, a single sign-on registration database, a single sign-on database and a single sign-on error program module.

12. The computer system of claim 11, the method further including, for a new target application not having links on said linkpage the computer implemented steps of:

selecting a new target application;

entering a new user-specific target application logon credential for logon and access to said new target application, and recording said new user-specific application logon credential using a network traffic recorder;

generating logon code for said new target application based on network traffic recorded by said traffic recorder and a logon sequence type;

storing said logon code and said user-specific target application logon credentials for said new target application in said registration database; and adding a link on said linkpage for said new target application.

13. The computer system of claim 12, the method further including the computer implemented steps of:

selecting said new target application from a list of enabled target applications.

14. The computer system of claim 13, the method further including the computer implemented steps of:
determining a logon sequence type for said new user-specific target application logon credentials.

15. The computer system of claim 14, wherein said logon sequence type is selected from the group consisting of (i) a HTTP request for a logon page, (ii) a HTTP response containing a form and a first cookie, (iii) a HTTP request with form fields set and said first cookie and (iv) a HTTP response with said first cookie and a second cookie, (v) a HTTP response with a first cookie, a second cookie and a HTTP redirect, and (vi) a HTTP request with form fields set and both said first and second cookies.

16. The computer system of claim 11, wherein said information for establishing a connection from said client machine to said target application further includes cookies and rewritten universal resource locators or combinations thereof.

17. The computer system of claim 11, wherein said information-processing network is an intranet, The Internet or a combination thereof.

18. The computer system of claim 11, wherein said access server is a portal server or an HTTP proxy server.

19. The computer system of claim 11, wherein said user-specific access server logon credentials include a user ID, a password or both a user ID and a password.

20. The computer system of claim 11, wherein said user-specific target application logon credentials include a user ID, a password or both a user ID and a password.

21. An access server connectable in an information processing network, comprising:
at least one processor;
a memory;
a computer program supported in said memory for enabling access to a target application on a target application server linked to said information-processing network, the computer program comprising:
means for accessing an access server from a browser on said client machine before accessing said target application server;
means for entering into said browser user-specific access server logon credentials for logon and access to said access server and logging onto said access server;
means for selecting, while logged on to said access server, a link to a target application of said one or more target applications from a linkpage presented to said browser by said access server, user-specific target application logon credentials for said target application having been previously stored in a registration database;
means for presenting, after said selecting said link, to said target application by said access server said stored user-specific target application logon credentials for logon and access to said target application in a form and according to a protocol recognizable by said target application and thereby logging into said target application on behalf of the user and establishing a target application session between said client machine and said target application;
means for bypassing said access server after establishing said target application session; and
wherein said client machine is linked to said access server by a network, both said client machine and said access server are linked to a single sign-on engine by said network and said single sign-on engine is linked to said target application server by said network, said single sign-on engine including two or more single sign-on logon servlets, a single sign-on database module, two or more single sign-on application servlets, a single sign-on registration database, a single sign-on database and a single sign-on error program module.

22. The access server of claim 21, wherein said means for accessing said access server includes a respective portlet for each target application of said one or more target application.

23. The access server of claim 21, wherein said means for establishing said target application session includes one or more single sign-on logon type servlets and one or more single sign-on application-specific logon procedure servlets.

* * * * *